(12) United States Patent
Li et al.

(10) Patent No.: US 8,486,850 B2
(45) Date of Patent: Jul. 16, 2013

(54) ALUMINOPHOSPHATE GLASS COMPOSITION

(75) Inventors: Hong Li, Sewickley, PA (US); Elizabeth Chase, Clarks Summit, PA (US); Joe Hayden, Clarks Summit, PA (US)

(73) Assignee: Schott Corporation, Elmsford, NY (US)

( * ) Notice: Subject to any disclaimer, the term of this patent is extended or adjusted under 35 U.S.C. 154(b) by 127 days.

(21) Appl. No.: 12/880,767

(22) Filed: Sep. 13, 2010

(65) Prior Publication Data

US 2012/0063479 A1    Mar. 15, 2012

(51) Int. Cl.
*C03C 3/17* (2006.01)
*C03C 3/19* (2006.01)

(52) U.S. Cl.
USPC ........... 501/48; 501/45; 501/46; 501/47; 501/78; 501/79; 372/40

(58) Field of Classification Search
USPC ............. 501/45, 46, 47, 48, 78, 79; 372/40
See application file for complete search history.

(56) References Cited

U.S. PATENT DOCUMENTS

| | | | |
|---|---|---|---|
| 3,248,234 A | 4/1966 | Godron | |
| 3,926,649 A | 12/1975 | Ray et al. | |
| 3,989,532 A | 11/1976 | Ray et al. | |
| 4,075,120 A | 2/1978 | Myers et al. | |
| 4,239,645 A * | 12/1980 | Izumitani et al. | 252/301.4 P |
| 4,661,284 A | 4/1987 | Cook et al. | |
| 4,820,662 A | 4/1989 | Izumitani et al. | |
| 4,875,920 A * | 10/1989 | Myers | 65/30.14 |
| 4,929,387 A | 5/1990 | Hayden et al. | |
| 4,962,067 A * | 10/1990 | Myers | 501/45 |
| 5,032,315 A | 7/1991 | Hayden et al. | |
| 5,053,165 A * | 10/1991 | Toratani et al. | 252/301.4 P |
| 5,173,456 A * | 12/1992 | Hayden et al. | 501/45 |
| 5,234,871 A * | 8/1993 | Krashkevich | 501/73 |
| 5,322,820 A | 6/1994 | Myers | |
| 5,526,369 A | 6/1996 | Hayden et al. | |
| 5,607,886 A | 3/1997 | Onozawa | |
| 5,663,972 A | 9/1997 | Payne | |
| 6,853,659 B2 | 2/2005 | Hayden | |
| 6,903,038 B2 | 6/2005 | Hayden et al. | |
| 6,911,160 B2 | 6/2005 | Myers et al. | |
| 7,538,051 B2 * | 5/2009 | Fujiwara et al. | 501/48 |
| 7,548,572 B2 * | 6/2009 | Schwartz et al. | 372/94 |
| 2004/0042515 A1 | 3/2004 | Hayden | |
| 2005/0233888 A1 | 10/2005 | Seneschal et al. | |
| 2006/0150682 A1 | 7/2006 | Fujiwara et al. | |
| 2012/0033694 A1 * | 2/2012 | Li et al. | 372/40 |

FOREIGN PATENT DOCUMENTS

| | | |
|---|---|---|
| DE | 3340968 | 5/1984 |
| EP | 0 356 746 | 3/1990 |
| EP | 0 398 198 | 11/1990 |
| WO | 9408373 A1 | 4/1994 |

OTHER PUBLICATIONS

Desurvire, Emmanuel. "Erbium-Doped Fiber Amplifiers-Principles and Applications." (Wiley-Interscience), 1994, pp. 215-218, 4.3.
Kassab, L.R.P. et al. "GeO2-PbO-Bi2O3 glasses doped with Yb3+ for laser applications." (Journal of Non-Crystalline Solids), 2004, pp. 103-107, No. 348.
Miniscalco, W.J. and R.S. Quimby. "General procedure for the analysis of Er3+ cross sections." (Optics Letters), Feb. 15, 1991, pp. 258-260.
European Patent Office Extended Search Report. Application No. EP 11 18 1059 Date: Mar. 7, 2012. (7 pages).

* cited by examiner

*Primary Examiner* — Karl Group
*Assistant Examiner* — Elizabeth A Bolden
(74) *Attorney, Agent, or Firm* — Millen, White, Zelano & Branigan, P.C.

(57) ABSTRACT

The invention relates to aluminophosphate-based glasses suitable for use as a solid laser medium, which further contains $SiO_2$ and $B_2O_3$. The laser glasses possess desirable figure of merit values for $FOM_{TM}$ and $FOM_{laser}$, as described herein.

25 Claims, No Drawings

ALUMINOPHOSPHATE GLASS COMPOSITION

SUMMARY OF THE INVENTION

The invention relates to aluminophosphate-based glasses suitable for use as a solid laser medium. In particular, the invention relates to improving the physical and laser properties of phosphate-based glass composition that also contain alumina, such as through the addition of certain amounts of silica and/or borate.

Laser glasses are produced by doping host glass systems with rare earth elements that have the ability to lase, such as neodymium and ytterbium. The lasing ability of these rare earth doped laser glasses results from the light amplification achieved by stimulated emission of the excited rare earth element ions within the glass.

Phosphate laser glasses are well known for use as a host matrix for high average power and high peak energy laser systems. For example, U.S. Pat. No. 4,661,284 (Cook et al.) discloses a neodymium-doped silica and/or boron-containing phosphate laser glass that is said to a relatively low self-concentration quenching rate, high thermal shock resistance and high induced emission cross-section compared to previous phosphate laser glasses. These glasses do not contain alumina.

U.S. Pat. No. 4,075,120 (Myers et al.) discloses laser phosphate glass compositions that are said to be suitable for high energy, high peak power laser applications, and described as containing substantial amounts of selected alkaline earth oxides and substantial amounts of selected alkali metal oxides. The glasses are further said to possess high gain, low nonlinear refractive index, good chemical durability and good optical quality. The specific glasses disclosed by U.S. Pat. No. '120 contain relatively high amounts of alkali metals and/or alkaline earth metals, and relatively low amounts of $Al_2O_3$.

U.S. Pat. No. 5,322,820 (Myers et al.) discloses phosphate glass compositions that are said to provide high average power operation with a balance of athermal performance, high gain, and high rupture strength. The glasses are also said to exhibit good chemical durability. The specific glasses disclosed by U.S. Pat. No. '820 contain relatively high amounts of $Al_2O_3$ and/or $La_2O_3$.

U.S. Pat. No. 4,929,387 (Hayden et al.) and U.S. Pat. No. 5,032,315 (Hayden et al.) disclose phosphate glass compositions, containing little or no silica, that are said to be useful in high average power laser while exhibiting high thermal conductivity and low coefficients of thermal expansion. The glasses are also said to exhibit good chemical durability. The specific glasses disclosed by U.S. Pat. No. '387 and U.S. Pat. No. '315 generally contain relatively high amounts of alkali metals and/or alkaline earth metals, in combination with relatively high amounts of $Al_2O_3$.

U.S. Pat. No. 5,053,165 (Tortani et al.) discloses phosphate-based glass compositions that are said to be suitable for high average power laser application, and characterized by strong thermal shock resistance. The specific glasses disclosed by Tortani et al. contain relatively high amounts of alkali metals and/or alkaline earth metals, and do not contain $SiO_2$ or $B_2O_3$.

U.S. Pat. No. 4,820,662 (Izumitani et al.) discloses phosphate glass compositions wherein part of the main component of the phosphate laser glass, $P_2O_5$, is replaced with $SiO_2$ to reduce the coefficient of thermal expansion and increase shock resistance. To counteract the deterioration of chemical durability due to the large amounts of $SiO_2$ in the phosphate, $Al_2O_3$ can be added to the glass. Also, replacing some of the $SiO_2$ with $Al_2O_3$ is said to decrease the stimulated emission cross section. The specific glasses disclosed by Izumitani et al. contain relatively high amounts of alkali metals in combination with relatively high total amounts of $SiO_2$ and $Al_2O_3$.

U.S. Pat. No. 6,853,659 (Hayden et al.) discloses a laser system for using highly doped phosphate-based glass compositions. The specific glasses disclosed by U.S. Pat. No. '659 contain relatively high amounts of rare earth metals, and do not contain $SiO_2$ or $B_2O_3$. U.S. Pat. No. 6,911,160 (Myer et al.) also discloses highly doped phosphate laser glasses.

U.S. Pat. No. 5,663,972 (Payne et al.) discloses Nd-doped phosphate laser glasses described as having broad emission bandwidths, i.e., greater than about 29 nm. The glass is composed primarily of $P_2O_5$, $Al_2O_3$, and MgO.

U.S. Pat. No. 5,526,369 and WO 94/08373 (Hayden et al.) also discloses Nd-doped phosphate laser glasses. In this case, the laser glass is said to desirably have a narrow emission bandwidth (less than 26 nm) to improve extraction efficiency. In this typical type of laser, the emission of the laser is narrow compared to the emission bandwidth, and thus, the emitted light at wavelengths outside of the narrow bandwidth at which the laser operates is effectively wasted. For this reason, narrow emission bandwidths were desirable. The glasses disclosed by U.S. Pat. No. '369 contain relatively high total amounts of alkali metals and alkaline earth metals.

In addition to phosphate glasses, silicates, borates, borosilicates, and aluminates have also been used as host glass matrix systems for lasing ions. Silicate, borate, borosilicates, and aluminate glasses have broader emission bandwidth for Nd lasing ions, in comparison to phosphate glasses.

However, there are disadvantages associate with the use of these glasses. For example, silicate glasses normally melt at very high temperature, unless they contain significant amount of modifiers, such as alkali metals or alkaline earths metals. Borate glasses, on the other hand, have low temperature melting characteristics, but they require substantially high concentrations of alkali metals or alkaline earth metals to be stable in ambient environments. Borosilicate glasses can be durable at ambient temperature and also are melted at temperatures comparable to standard commercial glasses, such as soda-lime glass. However, typical commercial borosilicate glasses contain significant amounts of alkali metals, which promote high borate volatility, similar to phosphate glass, during melting. Aluminate glasses exhibit particularly broad emission bandwidths and are attractive for short pulse laser operation. But, these glasses have a very high tendency towards crystallization.

As mentioned above, U.S. Pat. No. 5,663,972 discloses Nd-doped phosphate laser glasses having broad emission bandwidths that are composed primarily of $P_2O_5$, $Al_2O_3$, and MgO. This disclosure resulted in the production of the phosphate glass APG-2, sold by Schott North America, Inc. APG-2 is a laser glass having very desirable thermo-mechanical properties for high power laser use.

Another useful commercial phosphate-based glass having a broad emission bandwidth is the glass APG-1, also sold by Schott North America, Inc. This glass resulted from the disclosure of U.S. Pat. No. 4,929,387 (Hayden et al.) which as described above discloses phosphate glass compositions, containing little or no silica, and containing relatively high amounts of alkali metals and/or alkaline earth metals, in combination with relatively high amounts of $Al_2O_3$. While APG-2 contains significant amounts of MgO, APG-1, on the other hand, contains significant amounts of alkali metals. APG-1 is a laser glass having very desirable laser properties for high power laser use. Thus, in comparison, while both APG-1 and APG-2 glasses exhibit desirable properties for use in high power lasers, APG-1 exhibits better laser properties, while APG-2 exhibits better thermo-mechanical properties.

Thus, an aspect of the present invention is to provide a phosphate-based glass composition for use as a solid laser medium which, like the commercial glasses APG-1 and APG-2, contains $P_2O_5$ and $Al_2O_3$. In the glasses according to the invention a combination of desirable laser properties (such as possessed by APG-1) and desirable thermo-mechanical properties (such as possessed by APG-2) is sought through manipulation of the amounts of $SiO_2$ and/or $B_2O_3$.

Upon further study of the specification and appended claims, further aspects and advantages of this invention will become apparent to those skilled in the art.

In accordance with the invention, there is provided an aluminophosphate glass composition containing amounts of a $SiO_2$ and/or $B_2O_3$, which exhibits advantageous laser properties and thermo-mechanical properties, and which is suitable for use in a high power laser.

The glasses disclosed herein are suitable for use in large flashlamp pumped laser systems intended to generate mega-Joule levels of energy at repetition rates exceeding 10 Hz. Laser diode pumping is also possible. Such lasers have the potential to drive laser fusion power plants in the future. The glasses disclosed herein are also suitable in smaller lasers where high repetition rate operation is desirable while still having a large output fluence at or near the damage level of the employed optical components in the laser system. Applications of such laser systems include laser shock peening and plasma creation for scientific research or as a source for other radiation. Laser shock peening is a process whereby through use of a powerful laser compressive residual stress is produced in the surface of metals thereby increasing the fatigue life thereof.

In accordance with the invention, the aluminophosphate glass can optionally contain amounts of conventional modifier oxides, such as alkali and/or alkaline earth metals, so long as their inclusion does not result in poor melting behavior and does not compromise the desirable features of the aluminophosphate glass. The total amount of such modifiers is desirable less than about 26 mol % of monovalent modifiers, such as $Na_2O$, and less than about 25 mol % of divalent modifiers, such as MgO.

According to a further aspect of the invention, the glasses in accordance with the invention are characterized by either: (a) a relatively high amount of alkali metals $R_2O$ (R=Li, Na, K, Rb, Cs) in combination with a relatively low amount of alkaline earth metals MO (M=Mg, Ca, Sr, Ba, Zn); or (b) a relatively high amount of alkaline earth metals MO (M=Mg, Ca, Sr, Ba, Zn) in combination with a relatively low amount of alkali metals $R_2O$ (R=Li, Na, K, Rb, Cs).

In addition, while $P_2O_5$, $Al_2O_3$, $SiO_2$, and $B_2O_3$, are all network formers, the glasses according to the invention are phosphate-based glasses wherein the $P_2O_5$ content is greater than the sum of $SiO_2$, $B_2O_3$, and $Al_2O_3$.

Further, in the glasses according to the invention, it is desirable to keep the $Al_2O_3$ content within a relatively narrow range, particularly when higher amounts of alkali metals $R_2O$ are present.

In accordance with an aspect of the invention, the aluminophosphate glass composition comprises (based on mol %):

| | |
|---|---|
| $SiO_2$ | 0.00-12.00 |
| $B_2O_3$ | 0.00-15.00 |
| $Al_2O_3$ | 6.00-11.00 |
| $P_2O_5$ | 55.00-67.00 |
| $Li_2O$ | 0.50-26.00 |
| $K_2O$ | 0.00-4.00 |
| $Na_2O$ | 0.00-4.00 |
| $Rb_2O$ | 0.00-4.00 |
| $Cs_2O$ | 0.00-4.00 |
| MgO | 0.00-25.00 |
| ZnO | 0.00-6.00 |
| $TiO_2$ | 0.00-6.00 |
| $La_2O_3$ | 0.00-10.00 |
| $Nd_2O_3$ | 0.00-6.00 |
| $R_2O$ (R = Li, Na, K, Rb, Cs) | 0.50-26.00 |
| MO (M = Mg, Ca, Sr, Ba, Zn) | 0.00-25.00. | wherein $Ln_2O_3$ (Ln=Nd, Yb, or other lasing rare earth ions) is >0.00-10.00 mol % (for example, 0.01-10.00 mol % or 0.01-6.00 mol %);

$R_2O$ is 8.0-26.0 mol % and MO is 0.0-6.0 mol %, or $R_2O$ is 0.5-8.0 mol % and MO is 6.0-25.0 mol %;

the sum of $SiO_2$, $B_2O_3$, and $Al_2O_3$ is 6.0-28.0 mol %; and when $R_2O$ is $\geq$16.0 mol %, then $Al_2O_3$ is 6.0-10.0 mol % and the sum of $SiO_2$, $B_2O_3$, and $Al_2O_3$ is 6.0-15.0 mol %.

In accordance with another aspect of the invention, aluminophosphate glass composition comprises (based on mol %):

| | |
|---|---|
| $SiO_2$ | 0.00-12.00 |
| $B_2O_3$ | 0.00-15.00 |
| $Al_2O_3$ | 6.00-11.00 |
| $P_2O_5$ | 55.00-67.00 |
| $Li_2O$ | 0.50-26.00 |
| $K_2O$ | 0.00-4.00 |
| $Na_2O$ | 0.00-4.00 |
| $Rb_2O$ | 0.00-4.00 |
| $Cs_2O$ | 0.00-4.00 |
| MgO | 0.00-25.00 |
| ZnO | 0.00-6.00 |
| $TiO_2$ | 0.00-6.00 |
| $La_2O_3$ | 0.00-10.00 |
| $Nd_2O_3$ | 0.00-6.00 |
| $R_2O$ (R = Li, Na, K, Rb, Cs) | 0.50-26.00 |
| MO (M = Mg, Ca, Sr, Ba, Zn) | 0.00-25.00. | wherein $Ln_2O_3$ (Ln=Nd, Yb, or other lasing rare earth ions) is >0.00-10.00 mol % (for example, 0.01-10.00 or 0.01-6.00 mol %);

$R_2O$ is 8.0-26.0 mol % and MO is 0.0-6.0 mol %, or $R_2O$ is 0.5-8.0 mol % and MO is 6.0-25.0 mol %;

the sum of $SiO_2$ and $B_2O_3$ is 3-20 mol %, and the sum of $SiO_2$, $B_2O_3$, and $Al_2O_3$ is 6.0-28.0 mol %; and when $R_2O$ is $\geq$16.0 mol %, then $Al_2O_3$ is 6.0-10.0 mol % and the sum of $SiO_2$, $B_2O_3$, and $Al_2O_3$ is 6.0-15.0 mol %.

In accordance with another aspect of the invention, there is provided a glass composition comprising:
10.00 mol % $S_iO_2$ ($\pm$2.00 mol %),
8.00 mol % $B_2O_3$ ($\pm$2.00 mol %),
8.80 mol % $Al_2O_3$ ($\pm$1.00 mol %),
61.20 mol % $P_2O_5$ ($\pm$3.50 mol %),
10.80 mol % $Li_2O$ ($\pm$2.00 mol %),
<1.0 mol % MgO,
<1.0 mol % $La_2O_3$,
0.1-1.00 mol % $Nd_2O_3$ or $Yb_2O_3$ ($\pm$0.50 mol %), and
0.10 mol % $As_2O_3$ ($\pm$0.05 mol %).

In accordance with another aspect of the invention, there is provided a glass composition comprising:
8.50 mol % $S_iO_2$ ($\pm$2.00 mol %),
5.00 mol % $B_2O_3$ ($\pm$2.00 mol %),
10.00 mol % $Al_2O_3$ ($\pm$1.00 mol %), 61.20 mol % $P_2O_5$ (±3.50 mol %),
12.00 mol % $Li_2O$ (±2.00 mol %),
<1.0 mol % MgO,
<1.0 mol % $La_2O_3$,
0.1-1.00 mol % $Nd_2O_3$ or $Yb_2O_3$ (±0.50 mol %), and
0.10 mol % $As_2O_3$ (±0.05 mol %).

In accordance with another aspect of the invention, there is provided a glass composition comprising:
7.00 mol % $S_iO_2$ (±2.00 mol %),
7.00 mol % $B_2O_3$ (±2.00 mol %),
8.00 mol % $Al_2O_3$ (±1.00 mol %),
61.20 mol % $P_2O_5$ (±3.50 mol %),
10.00 mol % $Li_2O$ (±2.00 mol %),
5.00 mol % MgO (±1.00 mol %),
<1.0 mol % $La_2O_3$,
0.1-1.00 mol % $Nd_2O_3$ or $Yb_2O_3$ (±0.50 mol %), and
0.10 mol % $As_2O_3$ (±0.05 mol %).

In accordance with another aspect of the invention, there is provided a glass composition comprising:
4.00 mol % $S_iO_2$ (±2.00 mol %),
5.00 mol % $B_2O_3$ (±2.00 mol %),
9.00 mol % $Al_2O_3$ (±1.00 mol %),
61.20 mol % $P_2O_5$ (±3.50 mol %),
1.50 mol % $Li_2O$ (±2.00 mol %),
15.00 mol % MgO (±2.00 mol %),
<1.0 mol % $La_2O_3$,
0.2-1.00 mol % $Nd_2O_3$ or $Yb_2O_3$ (±0.50 mol %), and
0.10 mol % $As_2O_3$ (±0.05 mol %).

In accordance with another aspect of the invention, there is provided a glass composition comprising:
<3.0 mol % $S_iO_2$,
7.00 mol % $B_2O_3$ (±2.00 mol %),
10.00 mol % $Al_2O_3$ (±1.00 mol %),
60.00 mol % $P_2O_5$ (±3.50 mol %),
1.50 mol % $Li_2O$ (±2.00 mol %),
15.00 mol % MgO (A: 2.00 mol
5.00 mol % ZnO (±1.00 mol %),
<1.0 mol % $La_2O_3$,
0.3-1.00 mol % $Nd_2O_3$ or $Yb_2O_3$ (±0.50 mol %), and
0.10 mol % $As_2O_3$ (±0.05 mol %).

According to a further aspect of the invention, the glass composition contains 7-26 mol % $Li_2O$, the sum of $SiO_2$ and $B_2O_3$ is 3-20 mol %, and the sum of $SiO_2$, $B_2O_3$, and $Al_2O_3$ is 10.0-28.0 mol %.

According to a further aspect of the invention, the glass composition contains 14-25 mol % MgO, the sum of $SiO_2$ and $B_2O_3$ is 3-12 mol %, and the sum of $SiO_2$, $B_2O_3$, and $Al_2O_3$ is 10.0-25.0 mol %.

According to a further aspect of the invention, the glass composition contains 8.0-26.0 mol % $R_2O$ and 0.0-6.0 mol % MO. According to a further aspect of the invention, the glass composition contains 0.5-3.0 mol % $R_2O$ and 10.0-25.0 mol % MO.

With respect to the laser glass application, the aluminophosphate glass composition according to the invention contains a sufficient amount of $Ln_2O_3$, wherein Ln represents a rare earth lasing ion, to provide lasing capabilities. Generally, the amount of $Ln_2O_3$ is about 0.3-10.0 mol %, for example, 0.5-8.0 mol % or 0.3-6.0 mol % or 0.5-5.0 mol %. The lasing element Ln is preferably Nd, but can also be Yb, and even, for example, Er or Pr. Yb and Nd both lase in the IR range. Er has a lasing wavelength that is eyesafe, and Pr can lase at visible wavelengths. Still other lasing ions are Sm, Eu, Tb, Dy, Ho and Tm. The lasing ions can be used alone or in combinations of two or more elements.

These glass compositions employ $P_2O_5$ as the principle glass network former. The level of $P_2O_5$ is preferably maximized. Generally, the $P_2O_5$ content is 55-67, preferably 57-65, especially 59-62 mole %. The $P_2O_5$ content can also be, for example, 55.0, 56.0, 56.5, 57.0, 58.0, 58.5, 59.0, 60.0, 60.5, 61.0, 62.0, 62.5, 63.9, 64.0, 65.0, 66.0, etc., mole %.

$Al_2O_3$, $La_2O_3$, $SiO_2$ and $B_2O_3$ all act as network formers, and tend to enhance the chemical durability of the glass, and reduce water solubility. $SiO_2$ and $B_2O_3$ each act as primary network formers, in addition to $P_2O_5$. $Al_2O_3$ and $La_2O_3$ act as intermediate glass formers.

Amounts of $SiO_2$ can also increase thermal conductivity. However, large amounts of $SiO_2$ may increase the crystallization tendency and/or lead to phase separation, and may reduce emission cross section. The amount of $SiO_2$ used in preparing the glass is 0.0-12.0 mol %, such as 3.0-10.0 mol %, for example, 0.5, 1.0, 2.0, 3.0, 4.0, 5.0, 6.0, 7.0, 8.0, 9.0, 10.0, or 11.0 mol %.

$B_2O_3$ can also increase thermal conductivity. But, high amounts of $B_2O_3$ can adversely impact the thermal expansion and thereby reduce $FOM_{TM}$. The amount of $B_2O_3$ used in preparing the glass is 0.0-15.00, for example, 0.0-9.0 mol %, such as 3.0-9.0 mol %, for example, 0.5, 1.0, 2.0, 3.0, 4.0, 5.0, 6.0, 7.0, 8.0, 9.0, 10.0, 11.0, 12.0, 13.0, and 14.0 mol %.

As noted, $Al_2O_3$ and $La_2O_3$ act as intermediate glass formers. As a result, $Al_2O_3$ and $La_2O_3$ each exhibit characteristics of both a glass former and a glass modifier. $Al_2O_3$ can provide not only better chemical durability, but also better thermomechanical properties. However, high amounts of $Al_2O_3$ may induce crystallization, and reduce emission cross section and thermal expansion coefficient. The level of $Al_2O_3$ is generally 6.0 to 11.0%, such as 6.0-10.0%, or 6.5-10.5%. Other levels of $Al_2O_3$ are, for example, 7.0, 7.5, 7.8, 8.0, 8.5, 9.0, 9.5, 10.0, 10.5 mole %. The amount of $La_2O_3$ used in preparing the glass is 0.0-10.0%, such as 1.0-7.0 mol %, for example, 0.2, 0.5, 1.0, 2.0, 3.0, 4.0, 5.0, 6.0, 7.0, 8.0, or 9.0 mol %.

The alkaline earth metals, MO, enhance the chemical durability properties of the glass. In general, the amount of MO is up to 25.0 mol %. The preferred alkaline earth metal is MgO, since amounts of MgO tend to provide higher $FOM_{TM}$. Low amounts of ZnO can be beneficial with respect to $FOM_{TM}$. Preferably, the amount of MgO in the glass is up to 25.0 mol % (e.g., 14/0 to 24.0 mol %), the amount of ZnO is 0.0-6.0 mol %, the amounts of CaO, SrO, and BaO are each 0.0-5.0 mol %, especially 0.0-2.5 mol %, and in particular 0.0-1.0 mol %, and the total combined amount of CaO, SrO, and BaO is 0.0-5.0 mol %, especially 0.0-2.5 mol %, and in particular 0.0-1.0 mol %.

The alkali metals content, $R_2O$, will impact certain properties of the glass such as linear thermal expansion coefficient and emission cross section. In general, the amount of $R_2O$ is 0.50-26.00 mol %. The preferred alkali metal is $Li_2O$, since amounts of $Li_2O$ tend to provide higher $FOM_{TM}$. Preferably, the amount of $Li_2O$ in the glass is 0.50-26.00 mol %, preferably e.g., 7 to 26 mol %, the amounts of $Na_2O$, $K_2O$, $Rb_2O$, and $Cs_2O$ are each 0.0-4.0 mol %, especially 0.0-2.0 mol %, and in particular 0.0-1.0 mol %, and the total combined amount of $Na_2O$, $K_2O$, $Rb_2O$, and $Cs_2O$ is 0.0-4.0 mol %, especially 0.0-2.0 mol %, and in particular 0.0-1.0 mol %, such as 0.0-0.5 mol %.

According to a further aspect of the invention, the alkaline earth metals content, MO, is 0.0-6.0 mol %, especially 0.0-3.0 mol %, and the alkali metals content, $R_2O$, is 8.0-26.0 mol %, especially 10.0-25.0 mol %. In this case, the alkaline metal is preferably MgO, the amount of ZnO is 0.0-6.0 mol %, and the total combined amount of CaO, SrO, and BaO is 0.0-5.0 mol %, especially 0.0-2.5 mol %, and in particular 0.0-1.0 mol %. Also, in this case, the alkali metal is preferably $Li_2O$, and the total combined amount of $Na_2O$, $K_2O$, $Rb_2O$, and $Cs_2O$ is 0.0-4.0 mol %, especially 0.0-2.0 mol %, and in particular 0.0-1.0 mol %, such as 0.0-0.5 mol %.

According to another aspect of the invention, the alkaline earth metals content, MO, is 6.0-25.0 mol %, especially 14.0-24.0 mol %, and the alkali metals content, $R_2O$, is 0.5-8.0 mol %, especially 0.5-3.0 mol %. In this case, the alkaline metal is preferably MgO, the amount of ZnO is 0.0-6.0 mol %, and the total combined amount of CaO, SrO, and BaO is 0.0-5.0 mol %, especially 0.0-2.5 mol %, and in particular 0.0-1.0 mol %. Also, in this case, the alkali metal is preferably $Li_2O$, and the total combined amount of $Na_2O$, $K_2O$, $Rb_2O$, and $Cs_2O$ is 0.0-4.0 mol %, especially 0.0-2.0 mol %, and in particular 0.0-1.0 mol %, such as 0.0-0.5 mol %.

As noted above, $Yb_2O_3$ and/or $Nd_2O_3$ provide the preferred lasing ions for the glass composition. Alternatively, other rare earths or combinations of rare earth oxides can be used as lasing ions, for example $Er_2O_3$ and/or $Pr_2O_3$. In addition, as is well known to those skilled in the art, these laser glasses can be doped with small amounts of transition metals, such as $Cr_2O_3$, or other rare earth ions, such as $Yb_2O_3$ and $CeO_2$, that act as sensitizers to the primary lasing ion(s). For example, $Cr_2O_3$ can function as a sensitizer for Yb, and $CeO_2$, $Cr_2O_3$ and $Yb_2O_3$ can function as sensitizers for Er. For $Cr_2O_3$ the amount of sensitizer is, for example, >0.00 to 0.40 wt %, preferably 0.01 to 0.20 wt %, and for $Yb_2O_3$ the amount of sensitizer is, for example, >0.00 to the solubility limit for $Yb_2O_3$ in the glass, preferably 5 wt % to 25 wt %.

In addition to the laser application, glasses according to the invention prepared without a lasing ion can also be used as a cladding glass in a laser waveguide device. Additionally, by doping the glasses according to the invention with one or more transition metals that introduce absorption at the lasing wavelength, the resultant transition metal-doped glass can serve as an edge cladding glass in certain laser system designs.

With regards to the additional components, the glass contains a maximum of 4 wt %, especially a maximum of 2 wt %, of conventional additives or impurities, such as refining agents (e.g., $As_2O_3$ and $Sb_2O_3$) and antisolarants (e.g., $Nb_2O_5$). The glass can contain small amounts of $TiO_2$ as an antisolarant. However, as the presence of $TiO_2$ can lead to undesirable discoloration of the glass. Therefore, the amount of $TiO_2$ is preferably 0.0-1.0 mol %, especially 0-0.5 mol %.

In addition, the glass composition may contain halides to help dry the melt or residual water and to help refining of the glass. For example, the glass composition may contain up to 9 wt % F, preferably not more 5 wt %, and, up to 5 wt % Cl, although Cl is less preferred than F.

To be useful for the generation of high average power, phosphate-based laser glass should possess advantageous thermal-mechanical properties. During operation, cooling of the exterior surfaces of the solid laser material will result in the formation of a thermal gradient wherein the internal temperature of the material is higher than the temperature of the external surfaces. This thermal gradient can then lead to a stress gradient within the solid laser material which can eventually result in fracture of the active solid laser material.

In general, the thermal-mechanical properties of lasers are assessed by a parameter called the thermal-mechanical figure of merit, $FOM_{TM}$. The thermal mechanical figure of merit is proportional to the maximum thermal gradient that the material can tolerate without fracture, and also reflects the magnitude of the thermal gradient for a given situation.

The thermal-mechanical figure of merit, $FOM_{TM}$, is calculated by the following formula:

$$FOM_{TM}=K_{90C}K_{IC}(1-v)/(\alpha E)$$

wherein
$K_{90C}$ is the Thermal Conductivity measured at 90° C. [W/mK],
$K_{IC}$ is the Indentation Fracture Toughness,
v is Poisson's ratio,
E is Young's modulus [GPa]; and
α is the Linear Coefficient of Thermal Expansion, over 20-300° C. [$10^{-7}$/K].

The Indentation Fracture Toughness can be determined at a 3.0N Load or a 9.8N Load, whichever is needed to make the measurement. To make the measurement, a load is applied that will yield tiny cracks in the glass. Glasses needing the larger load 9.8N load to yield cracks are more attractive.

Thus, as can be seen from the above equation, to increase the $FOM_{TM}$ it is desirable to have a high thermal conductivity and low the coefficient of thermal expansion, Poisson's ratio, and Young's modulus. For a given thermal gradient, the amount of stress in the glass part is reduced as the product of thermal expansion and Young's modulus is lower, Higher values of thermal conductivity help to reduce the magnitude of the thermal gradient that results for a given amount of heat deposited into the glass.

Laser properties can be measured in accordance with the Judd-Ofelt theory, the Fuchtbauer-Ladenburg theory, or the McCumber method. A discussion of the Judd-Ofelt theory and the Fuchtbauer-Ladenburg theory can be found in E. Desurvire, *Erbium Doped Fiber Amplifiers*, John Wiley and Sons (1994), The McCumber method is as discussed in, for example, Miniscalco and Quimby, Optics Letters 16(4) pp 258-266 (1991). See also Kassab, Journal of Non-Crystalline Solids 348 (2004) 103-107. The Judd-Ofelt theory and the Fuchtbauer-Ladenburg theory evaluate laser properties from an emission curve, whereas the McCumber method uses the absorption curve of the glass.

Regarding emission bandwidth, if one has a measured emission curve (such as collected in a Judd-Ofelt or Fuchtbauer-Ladenburg analysis) or a calculated emission curve (from a McCumber analysis) one can get emission bandwidth in two ways. The first way is to simply measure the width at half of the maximum value (called emission bandwidth full width half maximum or $\Delta\lambda_{FWHM}$).

For glasses using Yb as the lasing ion, an emission curve for Yb will exhibit a narrow feature at ~980 nm. If this feature is prominent, the $\Delta\lambda_{FWHM}$ value will only reflect the width of this one feature and the rest of the curve will not contribute. As a result the $\Delta\lambda_{FWHM}$ value is not always a reliable indicator of the emission bandwidth for Yb.

The second method divides every point on the emission curve by the total area under the curve. The result, called a linewidth function, will have a peak value that is defined as the inverse of the effective bandwidth, $\Delta\lambda_{eff}$. By this method the entire emission curve always contributed to the emission bandwidth result. It is this value used herein in the analysis as the best indicator of emission bandwidth.

In solid state lasers, in order to generate high levels of total energy per pulse, the active material should possess a high value for laser figure-of-merit, $FOM_{laser}$, defined by the following formula:

$$FOM_{Laser}=\sigma_{em}\tau_{Rad}/(n_2\Delta\lambda_{eff})$$

wherein
$\sigma_{em}$ is the maximum emission cross section, [$\times 10^{-20}$ cm$^2$],
$\tau_{Rad}$ is the radiative lifetime, (μsec);
$n_2$ is the nonlinear refractive index; and
$\Delta\lambda_{eff}$ is the effective emission bandwidth, [nm].

This laser figure-of-merit has been developed in accordance with the invention to provide guidance in selecting glasses for use in high energy laser systems. Larger values of emission cross section provide higher laser gain for the same doping level, while larger values of radiative lifetime imply a higher amount of stored energy in the laser glass medium during pumping. Glasses with lower values of nonlinear index can support higher laser fluence values without the appearance of laser induced damage. Also, as discussed earlier, a narrow emission bandwidth is desirable as it provides a better overlap between the emitted light from the glass and the bandwidth of the actual laser system.

In accordance with another aspect of the invention, the aluminophosphate glass composition according to the invention possesses one or more of the following properties:
(1) a thermal-mechanical figure of merit, $FOM_{TM}$, of at least 0.9 W/m$^{1/2}$, preferably at least 1.1 W/m$^{1/2}$, especially at least 1.2 W/m$^{1/2}$, and in particular at least 1.3 W/m$^{1/2}$, for example 0.9-1.8 W/m$^{1/2}$;
(2) a maximum emission cross section, $\sigma_{em}$, of at least $2.5 \times 10^{-20}$ cm$^2$, preferably at least $2.8 \times 10^{-20}$ cm$^2$, especially at least $3.0 \times 10^{-20}$ cm$^2$, and in particular at least $3.2 \times 10^{-20}$ cm$^2$, for example $2.5$-$4.5 \times 10^{-20}$ cm$^2$.

EXAMPLES

Examples All of the glasses are made using laser grade ingredients and melted under a dry oxygen environment with stirring, using a Pt stirrer for better homogeneity.

Tables 1A and 1B list Examples 1-15 of the glass composition according to the invention, as well as Comparative Examples A-F (which do not contain SiO$_2$ or B$_2$O$_3$). In Table 1A, the glasses of Examples 1-8 and Comparative Examples A-C contain appreciable amounts of Li$_2$O. In Table 1B, the glasses of Examples 9-15 and Comparative Examples D-F contain appreciable amounts of MgO.

To determine the emission spectrum, the glasses are cast into molds and appropriately annealed to remove stress. Nd-doped glasses are prepared as bulk cuvette samples at least nominally 10 mm×10 mm×40 mm in size. Cuvette samples of each Nd doped glass is used to measure an emission spectrum, from which the effective emission bandwidth ($\Delta\lambda_{eff}$) is determined according to Equation (1):

$$\Delta\lambda_{eff} = \frac{\int I(\lambda)d\lambda}{I_{max}} \quad (1)$$

where the integrated area of the emission spectrum is made between 1000 nm to 1200 nm for Nd and the maximum emission intensity ($I_{max}$) is found at the wavelength close to 1055 nm for Nd.

Tables 2A and 2B summarize the optical, thermal, and physical properties of the glasses of Examples 1-15, in accordance with the invention, and Comparative Examples A-F. Table 2C summarize properties of commercial Nd-doped phosphate laser glasses APG-1 and APG-2, sold by Schott North America, Inc., as well as the glasses identified as APG-300 and APG-400. These latter two glasses correspond to test melts that have the same composition as the commercial glasses APG-1 and APG-2, but are substantial smaller in size (half liter versus 100 liter). Also, these melts are prepared using the same procedure used for making the tests melts of Examples 1-15 and A-F, rather than the full scale production used for making the commercial glasses APG-1 and APG-2. Thus, as can be seen in Table 2C, there are some differences between the properties of APG-300 and APG-400, in comparison to those of APG-1 and APG-2, respectively.

As can be seen from Table 2A, the thermal-mechanical figure of merit values, $FOM_{TM}$, for Examples 1-8 are higher than those of Comparative Examples A-C. However, all of these glasses have lower thermal-mechanical figure of merit values than that of the APG-2 glass test melt, i.e., APG-400. As noted above of the two commercial glasses APG-1 and APG-2, the latter has the better thermal-mechanical properties.

As can be seen from Table 2A, the thermal-mechanical figure of merit values, $FOM_{TM}$, for Examples 9-15 are higher than those of Comparative Example D and Comparative Examples F. However, the glasses of Examples 9, 10, and 14 showed lower thermal-mechanical figure of merit values than that of Comparative Example E. As shown in Table 3B, Comparative Example E exhibits a very low Laser figure of merit value.

Tables 3A and 3B summarize the laser properties of the glasses of Examples 1-15, in accordance with the invention, and Comparative Examples A-F. Table 3C summarizes the laser properties of APG-1, APG-2, APG-300 and APG-400.

As can be seen from Table 3A, the Laser figure of merit values, $FOM_{Laser}$, for Examples 1-8 are higher than those of Comparative Example B and Comparative Example C. However, the glasses of Examples 5, 7, and 8 showed lower Laser figure of merit values than that of Comparative Example A. As shown in Table 2A, Comparative Example A exhibits a low thermal-mechanical figure of merit value.

Referring to Table 3B, the Laser figure of merit values, $FOM_{Laser}$, for Examples 9-15 are higher than those of Comparative Example E, and only Example 12 has a lower Laser figure of merit value than those of Comparative Examples D and F. On the other hand, Example 12 exhibits a high thermal-mechanical figure of merit value.

The last line in Tables 2A and 2B provide a percentage comparison of the $FOM_{TM}$ values of Examples 1-15 and Comparative Examples A-F with that of the APG-2 control melt, i.e., APG-400. The last line in Tables 3A and 313 provide a percentage comparison of the $FOM_{Laser}$ values of Examples 1-15 and Comparative Examples A-F with that of the APG-1 control melt, i.e., APG-300. Adding these two percentages together for each of the glasses, one can see that the glasses of Examples 1-15 exhibit advantageous thermal-mechanical and laser properties, in comparison to the glasses that do not contain SiO$_2$ or B$_2$O$_3$, i.e. Comparative Examples A-F.

TABLE 1A

Examples of P$_2$O$_5$—Al$_2$O$_3$—B$_2$O$_3$/SiO$_2$ Glass Compositions (mol %) with high Alkali Metal Content

| Metal Oxide Content | EXAMPLES | | | | | | | | | | |
|---|---|---|---|---|---|---|---|---|---|---|---|
| | 1 | 2 | 3 | 4 | 5 | 6 | 7 | 8 | A | B | C |
| S$_i$O$_2$ | | 5.00 | 5.00 | 10.00 | 5.00 | 8.50 | 7.00 | 5.00 | | | |
| B$_2$O$_3$ | 5.00 | | 5.00 | 8.00 | 5.00 | 5.00 | 7.00 | 6.00 | | | |

TABLE 1A-continued

Examples of $P_2O_5$—$Al_2O_3$—$B_2O_3$/$SiO_2$ Glass Compositions (mol %) with high Alkali Metal Content

| Metal Oxide Content | EXAMPLES | | | | | | | | | | |
|---|---|---|---|---|---|---|---|---|---|---|---|
| | 1 | 2 | 3 | 4 | 5 | 6 | 7 | 8 | A | B | C |
| $Al_2O_3$ | 6.83 | 8.83 | 9.83 | 8.83 | 10.83 | 10.83 | 7.83 | 8.83 | 6.83 | 6.83 | 5.83 |
| $P_2O_5$ | 61.27 | 61.27 | 61.27 | 61.27 | 61.27 | 61.27 | 61.27 | 64.27 | 61.27 | 61.27 | 61.27 |
| $Li_2O$ | 24.59 | 17.59 | 14.59 | 10.78 | 8.78 | 11.78 | 9.59 | 9.78 | 24.59 | 24.59 | 20.59 |
| MgO | | | | | | | | 5.00 | | | |
| $TiO_2$ | | | | | | | | | | 5.00 | |
| ZnO | | | | | | | | | | | |
| $La_2O_3$ | 1.19 | 6.19 | 3.19 | | 8.00 | 1.50 | 1.19 | | 6.19 | 1.19 | 11.19 |
| $Nd_2O_3$ | 1.00 | 1.00 | 1.00 | 1.00 | 1.00 | 1.00 | 1.00 | 1.00 | 1.00 | 1.00 | 1.00 |
| $As_2O_3$ | 0.12 | 0.12 | 0.12 | 0.12 | 0.12 | 0.12 | 0.12 | 0.12 | 0.12 | 0.12 | 0.12 |
| Total | | | | | | | | | | | |

TABLE 1B

Examples of $P_2O_5$—$Al_2O_3$—$B_2O_3$/$SiO_2$ Glass Compositions (mol %) with high Alkaline Earth Metals Content

| Metal Oxide Content | EXAMPLES | | | | | | | | | |
|---|---|---|---|---|---|---|---|---|---|---|
| | 9 | 10 | 11 | 12 | 13 | 14 | 15 | D | E | F |
| $SiO_2$ | | 5.00 | 4.00 | 5.00 | 8.00 | 3.00 | | | | |
| $B_2O_3$ | 5.00 | | 5.00 | 5.00 | | 4.00 | 7.00 | | | |
| $Al_2O_3$ | 6.83 | 8.83 | 8.83 | 9.83 | 9.83 | 9.83 | 9.83 | 6.83 | 6.83 | 8.83 |
| $P_2O_5$ | 61.27 | 61.27 | 61.27 | 59.27 | 59.27 | 59.27 | 59.27 | 61.27 | 61.27 | 61.27 |
| $Li_2O$ | 1.50 | 1.50 | 1.50 | 1.50 | 1.50 | 1.50 | 1.50 | 1.50 | 1.50 | 1.50 |
| MgO | 23.09 | 18.09 | 15.09 | 15.08 | 15.08 | 15.08 | 15.08 | 23.09 | 23.09 | 17.09 |
| $TiO_2$ | | | | | | | | | 5.00 | |
| ZnO | | | | 3.00 | 5.00 | 5.00 | 5.00 | | | |
| $La_2O_3$ | 1.19 | 6.19 | 3.19 | | | 1.00 | 1.00 | 6.19 | 1.19 | 11.19 |
| $Nd_2O_3$ | 1.00 | 1.00 | 1.00 | 1.20 | 1.20 | 1.20 | 1.20 | 1.00 | 1.00 | 1.00 |
| $As_2O_3$ | 0.12 | 0.12 | 0.12 | 0.12 | 0.12 | 0.12 | 0.12 | 0.12 | 0.12 | 0.12 |
| Total | | | | | | | | | | |

TABLE 2A

Optical, Thermal, and Physical Properties of Example Compositions

| Optical/Thermal/Physical Property | Examples | | | | |
|---|---|---|---|---|---|
| | 1 | 2 | 3 | 4 | 5 |
| Refractive Index at 587 nm @ 30° C./hr, $n_d$ | 1.53182 | 1.54850 | 1.53808 | 1.52524 | 1.54783 |
| Abbe Number, $V_d$ | 67.67 | 65.30 | 67.08 | 68.07 | 64.83 |
| Density, $\rho$ [g/cm$^3$] | 2.588 | 2.806 | 2.692 | 2.554 | 2.847 |
| Thermal Conductivity @ 25 C., $K_{25° C.}$ [W/mK] | 0.77 | 0.64 | 0.72 | 0.82 | 0.64 |
| Thermal Conductivity @ 90 C., $K_{90° C.}$ [W/mK] | 0.86 | 0.95 | 0.84 | 0.95 | 0.76 |
| Poisson Ratio, $\nu$ | 0.25 | 0.25 | 0.24 | 0.22 | 0.24 |
| Young's Modulus, E [GPa] | 63.8 | 64.8 | 69.1 | 71.5 | 66.1 |
| Linear Coef. of Thermal Expansion, $\alpha_{20\text{-}300\ C.}$ [$10^{-7}$/K] | 108.3 | 90.0 | 84.5 | 81.6 | 71.8 |
| Softening Point, $T_{sp}$ [° C.] | 547.5 | 590.4 | 630.9 | 689.2 | 662.7 |
| Glass Transition Temperature, $T_g$ [° C.] | 449 | 485 | 504 | 539 | 538 |
| Knoop Hardness, HK | 427 | 423 | 496 | 554 | 465 |
| $\alpha_{3.333\ mm}$ [cm$^{-1}$] (A measure of residual OH content) | 1.28 | 0.58 | 0.94 | 1.77 | 0.71 |
| $\alpha_{3.0\ mm}$ [cm$^{-1}$] (A measure of residual OH content) | 0.64 | 0.35 | 0.49 | 0.89 | 0.39 |
| $FOM_{TM} = K_{90° C.} K_{IC} (1 - \nu)/(\alpha E)$ (W/m$^{1/2}$) | 0.97 | 1.24 | 1.16 | 1.49 | 1.27 |
| $FOM_{TM}$ (Improvement from APG-2 Control Melt) | −42% | −27% | −31% | −12% | −25% |

| Optical/Thermal/Physical Property | Examples | | | | | |
|---|---|---|---|---|---|---|
| | 6 | 7 | 8 | A | B | C |
| Refractive Index at 587 nm @ 30° C./hr, $n_d$ | 1.52997 | 1.52905 | 1.52599 | 1.55084 | 1.55869 | 1.57017 |

TABLE 2A-continued

Optical, Thermal, and Physical Properties of Example Compositions

| | | | | | | |
|---|---|---|---|---|---|---|
| Abbe Number, $V_d$ | 68.77 | 68.28 | 68.79 | 64.35 | 50.54 | 62.90 |
| Density, $\rho$ [g/cm$^3$] | 2.626 | 2.614 | 2.567 | 2.805 | 2.616 | 3.004 |
| Thermal Conductivity @ 25 C., $K_{25°\,C.}$ [W/mK] | 0.76 | 0.76 | 0.79 | 0.58 | 0.77 | 0.59 |
| Thermal Conductivity @ 90 C., $K_{90°\,C.}$ [W/mK] | 0.88 | 0.89 | 0.92 | 0.64 | 0.83 | 0.68 |
| Poisson Ratio, $\nu$ | 0.23 | 0.23 | 0.22 | 0.26 | 0.25 | 0.26 |
| Young's Modulus, E [GPa] | 72.2 | 71.4 | 73.6 | 63.3 | 63.9 | 64.3 |
| Linear Coef. of Thermal Expansion, $\alpha_{20\text{-}300\,C.}$ [10$^{-7}$/K] | 78.5 | 74.9 | 76.9 | 106.3 | 106.0 | 94.7 |
| Softening Point, $T_{sp}$ [° C.] | 668.4 | 672.0 | 674.7 | 547.4 | 561.9 | 570.4 |
| Glass Transition Temperature, $T_g$ [° C.] | 535 | 533 | 537 | 460 | 456 | 478 |
| Knoop Hardness, HK | 473 | 475 | 518 | 404 | 413 | 382 |
| $\alpha_{3.333\,mm}$ [cm$^{-1}$] (A measure of residual OH content) | 0.86 | 1.12 | 1.55 | 0.84 | 0.78 | 0.46 |
| $\alpha_{3.0\,mm}$ [cm$^{-1}$] (A measure of residual OH content) | 0.43 | 0.55 | 0.87 | 0.52 | 0.42 | 0.31 |
| FOM$_{TM}$ = $K_{90°\,C.}K_{IC}(1-\nu)/(\alpha E)$ (W/m$^{1/2}$) | 1.27 | 1.35 | 1.14 | 0.56 | 0.80 | 0.59 |
| FOM$_{TM}$ (Improvement from APG-2 Control Melt) | −25% | −20% | −32% | −67% | −52% | −65% |

TABLE 2B

Optical, Thermal, and Physical Properties of Further Example Compositions

| Optical/Thermal/ Physical Property | Examples | | | | | | | | | |
|---|---|---|---|---|---|---|---|---|---|---|
| | 9 | 10 | 11 | 12 | 13 | 14 | 15 | D | E | F |
| Refractive Index at 587 nm @ 30° C./hr, $n_d$ | 1.51337 | 1.52475 | 1.52301 | 1.51254 | 1.51242 | 1.51627 | 1.51717 | 1.53896 | 1.54387 | 1.55308 |
| Abbe Number, $V_d$ | 67.39 | 65.73 | 66.52 | 68.28 | 67.55 | 66.96 | 67.20 | 64.55 | 49.44 | 63.29 |
| Density, $\rho$ [g/cm$^3$] | 2.572 | 2.694 | 2.653 | 2.562 | 2.576 | 2.611 | 2.608 | 2.823 | 2.611 | 2.938 |
| Indentation Fracture Toughness for 3.0N Load, $K_{IC}$ [MPa·m$^{1/2}$] | 0.90 | | | 1.00 | | 0.87 | 1.00 | 0.82 | | 0.60 |
| Indentation Fracture Toughness for 9.8N Load, $K_{IC}$ [MPa·m$^{1/2}$] | | 0.98 | 1.15 | | 0.96 | | | | 0.95 | |
| Thermal Conductivity @ 25° C., $K_{25°\,C.}$ [W/mK] | 0.76 | 0.66 | 0.69 | 0.74 | 0.71 | 0.69 | 0.70 | 0.66 | 0.83 | 0.59 |
| Thermal Conductivity @ 90° C., $K_{90°\,C.}$ [W/mK] | 0.82 | 0.77 | 0.82 | 0.86 | 0.84 | 0.81 | 0.84 | 0.71 | 0.84 | 0.69 |
| Poisson Ratio, $\nu$ | 0.24 | 0.24 | 0.23 | 0.23 | 0.23 | 0.23 | 0.23 | 0.25 | 0.24 | 0.26 |
| Young's Modulas, E [GPa] | 64.5 | 62.6 | 65.2 | 66.3 | 64.7 | 63.7 | 64.6 | 62.0 | 64.3 | 62.6 |
| Linear Coef. of Thermal Expansion, $\alpha_{20\text{-}300\,C.}$ [10$^{-7}$/K] | 67.9 | 66.7 | 65.0 | 61.8 | 62.5 | 62.0 | 59.2 | 68.9 | 61.4 | 68.3 |
| Softening Point, $T_{sp}$ [° C.] | 697.2 | | 732.7 | 743.9 | 711.4 | 715.7 | 725.6 | 671.4 | | 679.7 |
| Glass Transition Temperature, $T_g$ [° C.] | 558 | 566 | 564 | 578 | 564 | 562 | 569 | 544 | 568 | 551 |
| Knoop Hardness, HK | 407 | 409 | 462 | 498 | 401 | 429 | 436 | 394 | 408 | 419 |
| $\alpha_{3.333\,mm}$ [cm$^{-1}$] (A measure of residual OH content) | 0.82 | 0.44 | 0.82 | 0.92 | 0.50 | 0.08 | 0.92 | 0.40 | 0.50 | 0.49 |
| $\alpha_{3.0\,mm}$ [cm$^{-1}$] (A measure of residual OH content) | 0.41 | 0.26 | 0.42 | 0.49 | 0.29 | 0.43 | 0.44 | 0.24 | 0.30 | 0.35 |
| FOM$_{TM}$ = $K_{90°\,C.}K_{IC}(1-\nu)/(\alpha E)$ (W/m$^{1/2}$) | 1.29 | 1.37 | 1.70 | 1.62 | 1.53 | 1.37 | 1.68 | 1.02 | 1.54 | 0.71 |
| FOM$_{TM}$ (Improvement from APG-2 Control Melt) | −24% | −19% | 1% | −4% | −9% | −19% | 0% | −39% | −9% | −58% |

TABLE 2C

Optical, Thermal, and Physical Properties of Comparison Glasses

| Optical/Thermal/Physical Property | Glasses | | | |
|---|---|---|---|---|
| | APG-1 | APG-300 | APG-2 | APG-400 |
| Refractive Index at 587 nm @ 30° C./hr, $n_d$ | | | 1.513 | 1.50900 |
| Abbe Number, $V_d$ | | | 66.9 | 67.40 |

TABLE 2C-continued

Optical, Thermal, and Physical Properties of Comparison Glasses

| Optical/Thermal/Physical Property | APG-1 | APG-300 | APG-2 | APG-400 |
|---|---|---|---|---|
| Density, $\rho$ [g/cm$^3$] | | | 2.559 | 2.561 |
| Indentation Fracture Toughness for 3.0N Load, $K_{IC}$ [MPa·m$^{1/2}$] | | | | |
| Indentation Fracture Toughness for 9.8N Load, $K_{IC}$ [MPa·m$^{1/2}$] | | | | 1.05 |
| Thermal Conductivity @ 25° C., $K_{25°C.}$ [W/mK] | 0.78 | 0.79 | 0.80 | 0.76 |
| Thermal Conductivity @ 90° C., $K_{90°C.}$ [W/mK] | 0.83 | 0.86 | 0.84 | 0.83 |
| Poisson Ratio, $\nu$ | 0.24 | 0.25 | 0.23 | 0.24 |
| Young's Modulas, E [GPa] | 70 | 66.8 | 63.8 | 61.7 |
| Linear Coef. of Thermal Expansion, $\alpha_{20-300\,C}$ [10$^{-7}$/K] | 99.6 | 99.3 | 62.6 | 63.7 |
| Softening Point, $T_{sp}$ [° C.] | | | | 668.4 |
| Glass Transition Temperature, $T_g$ [° C.] | 450 | 457 | | 546 |
| Knoop Hardness, HK | 450 | 434 | 420 | 400 |
| $\alpha_{3.333\,mm}$ [cm$^{-1}$] (A measure of residual OH content) | | 1.28 | | 0.47 |
| $\alpha_{3.0\,mm}$ [cm$^{-1}$] (A measure of residual OH content) | | 0.64 | | 0.27 |
| FOM$_{TM}$ = $K_{90°C.}K_{IC}(1-\nu)/(\alpha E)$ (W/m$^{1/2}$) | | 0.84 | | 1.69 |
| FOM$_{TM}$ (Improvement from APG-2 Control Melt) | | −50% | | 0% |

TABLE 3A

Laser Properties of Example Compositions according to the Invention

| Laser Property | 1 | 2 | 3 | 4 | 5 | 6 | 7 | 8 | A | B | C |
|---|---|---|---|---|---|---|---|---|---|---|---|
| Refractive Index at 1054 nm, $n_{1054\,nm}$ | 1.524 | 1.540 | 1.530 | 1.515 | 1.539 | 1.522 | 1.521 | 1.518 | 1.542 | 1.547 | 1.561 |
| Non-linear Refractive Index, $n_2$ [10$^{-13}$ esu] | 1.11 | 1.23 | 1.15 | 1.07 | 1.24 | 1.08 | 1.09 | 1.07 | 1.27 | 1.86 | 1.39 |
| Fluorescence Lifetime, $\tau$ [μsec] | 350 | 360 | 365 | 352 | 366 | 376 | 359 | 355 | 354 | 315 | 342 |
| Input Nd$_2$O$_3$ [wt %] | 3.00 | 2.63 | 2.76 | 2.94 | 2.46 | 2.84 | 2.89 | 2.90 | 2.69 | 2.98 | 2.42 |
| Peak Emission Wavelength, $\lambda_{Peak}$ [nm] | 1053.6 | 1054.2 | 1053.6 | 1053.2 | 1055.0 | 1053.7 | 1052.7 | 1052.6 | 1054.3 | 1053.7 | 1054.3 |
| Effective Emission Bandwidth, $\Delta\lambda_{eff}$ [nm] | 27.3 | 27.3 | 30.3 | 25.5 | 29.8 | 28.5 | 34.4 | 26.6 | 28.8 | 26.4 | 29.8 |
| Maximum Emission Cross Section, $\sigma_{em}$ [×10$^{-20}$ cm$^2$] | 3.89 | 3.54 | 3.14 | 4.31 | 2.83 | 3.43 | 2.96 | 3.96 | 3.39 | 4.22 | 3.12 |
| FWHM Emission Bandwidth, $\Delta\lambda_{FWHM}$ [nm] | 22.6 | 23.5 | 24.1 | 24.0 | 24.9 | 24.0 | 23.3 | 22.8 | 23.6 | 23.1 | 24.3 |
| Radiative Lifetime, $\tau_{Rad}$ (μsec) | 325 | 354 | 365 | 323 | 407 | 359 | 344 | 334 | 346 | 298 | 359 |
| Judd-Ofelt Parameter, $\Omega_2$ [10$^{-20}$ cm$^2$] | 4.36 | 4.64 | 4.91 | 5.90 | 5.18 | 5.39 | 5.67 | 5.75 | 4.10 | 4.74 | 4.21 |
| Judd-Ofelt Parameter, $\Omega_4$ [10$^{-20}$ cm$^2$] | 5.20 | 4.47 | 4.39 | 5.08 | 3.92 | 4.55 | 4.71 | 4.87 | 4.68 | 5.52 | 4.22 |
| Judd-Ofelt Parameter, $\Omega_6$ [10$^{-20}$ cm$^2$] | 5.75 | 5.25 | 5.22 | 6.11 | 4.56 | 5.38 | 5.65 | 5.86 | 5.23 | 5.88 | 4.97 |
| FOM$_{Laser}$ = $\sigma_{em}\tau_{Rad}/(n_2\Delta\lambda_{eff})$ (×10$^{-n}$) | 41.67 | 37.23 | 32.93 | 50.95 | 30.97 | 40.10 | 27.24 | 46.73 | 32.09 | 25.54 | 26.99 |

TABLE 3A-continued

Laser Properties of Example Compositions according to the Invention

| Laser Property | 1 | 2 | 3 | 4 | 5 | 6 | 7 | 8 | A | B | C |
|---|---|---|---|---|---|---|---|---|---|---|---|
| $FOM_{Laser}$ (Improvement from APG-1 Control Melt) | 8% | −3% | −15% | +32% | −20% | 4% | −29% | 21% | −17% | −34% | −30% |

TABLE 3B

Laser Properties of Further Example Compositions according to the Invention

| Laser Property | 9 | 10 | 11 | 12 | 13 | 14 | 15 | D | E | F |
|---|---|---|---|---|---|---|---|---|---|---|
| Refractive Index at 1054 nm, $n_{1054\,nm}$ | 1.505 | 1.516 | 1.515 | 1.505 | 1.505 | 1.508 | 1.509 | 1.530 | 1.532 | 1.544 |
| Non-linear Refractive Index, $n_2$ [$10^{-13}$ esu] | 1.06 | 1.14 | 1.11 | 1.03 | 1.05 | 1.08 | 1.07 | 1.22 | 1.84 | 1.31 |
| Fluorescence Lifetime, $\tau$ [µsec] | 316 | 323 | 350 | 350 | 346 | 344 | 344 | 314 | 257 | 323 |
| Input $Nd_2O_3$ [wt %] | 3.52 | 3.26 | 3.30 | 3.55 | 3.55 | 3.46 | 3.45 | 3.17 | 3.51 | 2.88 |
| Peak Emission Wavelength, $\lambda_{Peak}$ [nm] | 1054.8 | 1054.5 | 1053.9 | 1054.2 | 1054.2 | 1053.6 | 1053.7 | 1055.8 | 1055.2 | 1056.0 |
| Effective Emission Bandwidth, $\Delta\lambda_{eff}$ [nm] | 31.7 | 29.7 | 30.4 | 38.2 | 31.7 | 31.0 | 30.8 | 32.7 | 31.4 | 31.0 |
| Maximum Emission Cross Section, $\sigma_{em}$ [$\times 10^{-20}$ cm$^2$] | 2.87 | 2.84 | 2.74 | 2.20 | 2.82 | 2.66 | 2.62 | 2.68 | 3.08 | 2.75 |
| FWHM Emission Bandwidth, $\Delta\lambda_{FWHM}$ [nm] | 26.3 | 25.8 | 26.1 | 27.0 | 26.1 | 25.4 | 25.7 | 26.1 | 26.9 | 26.4 |
| Radiative Lifetime, $\tau_{Rad}$ (µsec) | 388 | 416 | 424 | 425 | 401 | 431 | 438 | 390 | 328 | 399 |
| Judd-Ofelt Parameter, $\Omega_2$ [$10^{-20}$ cm$^2$] | 6.58 | 5.99 | 6.03 | 6.09 | 6.15 | 5.99 | 6.05 | 5.62 | 6.34 | 5.34 |
| Judd-Ofelt Parameter, $\Omega_4$ [$10^{-20}$ cm$^2$] | 4.60 | 4.04 | 3.97 | 4.04 | 4.27 | 3.95 | 3.91 | 4.34 | 6.11 | 4.02 |
| Judd-Ofelt Parameter, $\Omega_6$ [$10^{-20}$ cm$^2$] | 4.96 | 4.64 | 4.57 | 4.67 | 4.96 | 4.56 | 4.46 | 4.68 | 4.70 | 4.55 |
| $FOM_{Laser} = \sigma_{em}\tau_{Rad}/(n_2\Delta\lambda_{eff})$ ($\times 10^{-n}$) | 33.28 | 35.03 | 34.42 | 23.72 | 34.02 | 34.34 | 34.69 | 26.26 | 17.46 | 27.05 |
| $FOM_{Laser}$ (Improvement from APG-1 Control Melt) | −14% | −9% | −11% | −38% | −12% | −11% | −10% | −32% | −55% | −30% |

TABLE 3C

Laser Properties of Nd-doped Phosphate Comparison Glasses

| Laser Property | APG-1 | APG-300 | APG-2 | APG-400 |
|---|---|---|---|---|
| Refractive Index at 1054 nm, $n_{1054}$ nm | 1.526 | 1.525 | 1.530 | 1.532 |
| Non-linear Refractive Index, $n_2$ [$10^{-13}$ esu] | 1.13 | 1.11 | 1.22 | 1.84 |
| Fluorescence Lifetime, $\tau$[µsec] | | 354 | 314 | 257 |
| Input $Nd_2O_3$ [wt %] | | 2.96 | 3.17 | 3.51 |
| Peak Emission Wavelength, $\lambda_{Peak}$ [nm] | 1053.9 | 1054.3 | 1055.8 | 1055.2 |
| Effective Emission Bandwidth, $\Delta\lambda_{eff}$ [nm] | 27.8 | 28.4 | 32.7 | 31.4 |
| Maximum Emission Cross Section, $\sigma_{em}$ [x$10^{-20}$ cm$^2$] | 3.35 | 3.68 | 2.68 | 3.08 |
| FWHM Emission Bandwidth, $\Delta\lambda_{FWHM}$ [nm] | | 23.3 | 26.1 | 26.9 |
| Radiative Lifetime, $\tau_{Rad}$ (µsec) | 361 | 331 | 390 | 328 |
| Judd-Ofelt Parameter, $\Omega_2$ [$10^{-20}$ cm$^2$] | | 4.43 | 5.62 | 6.34 |
| Judd-Ofelt Parameter, $\Omega_4$ [$10^{-20}$ cm$^2$] | | 5.05 | 4.34 | 6.11 |
| Judd-Ofelt Parameter, $\Omega_6$ [$10^{-20}$ cm$^2$] | | 5.68 | 4.68 | 4.70 |
| $FOM_{Laser} = \sigma_{em}\tau_{Rad}/(n_2\Delta\lambda_{eff})$ ($\times 10^{-n}$) | | 38.54 | 26.26 | 17.46 |
| $FOM_{Laser}$ (Improvement from APG-1 Control Melt) | | 0% | −32% | −55% |

The entire disclosure[s] of all applications, patents and publications, cited herein, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An aluminophosphate glass composition comprising (based on mol %):

| | |
|---|---|
| $SiO_2$ | 0.00-12.00 |
| $B_2O_3$ | 0.00-15.00 |
| $Al_2O_3$ | 6.00-11.00 |
| $P_2O_5$ | 55.00-67.00 |
| $Li_2O$ | 0.50-26.00 |
| $K_2O$ | 0.00-4.00 |
| $Na_2O$ | 0.00-4.00 |
| $Rb_2O$ | 0.00-4.00 |
| $Cs_2O$ | 0.00-4.00 |
| MgO | 0.00-5.00 |
| ZnO | 0.00-5.00 |
| $TiO_2$ | 0.00-6.00 |
| $La_2O_3$ | 0.00-10.00 |
| $Nd_2O_3$ | 0.00-6.00 |
| $R_2O$ (R = Li, Na, K, Rb, Cs) | 8.0-26.00 |
| MO (M = Mg, Ca, Sr, Ba, Zn) | 0.0-5.0 | wherein
(a) $Ln_2O_3$ (Ln=Nd, Yb, or other lasing rare earth ions) is >0.00-10.00 mol %;
(b) the sum of $SiO_2$, $B_2O_3$, and $Al_2O_3$ is 6.0-28.0 mol %;
(c) when $R_2O$ is $\geq 16.0$ mol %, then $Al_2O_3$ is 6.0-10.0 mol % and the sum of $SiO_2$, $B_2O_3$, and $Al_2O_3$ is 6.0-15.0 mol %; and
(d) said glass contains $SiO_2$ and $B_2O_3$.

2. The aluminophosphate glass composition according to claim 1, wherein the sum of $SiO_2$ and $B_2O_3$ is 3-20 mol %.

3. The aluminophosphate glass composition according to claim 1, wherein said glass composition comprises:
10.00 mol % $SiO_2$ (±2.00 mol %),
8.00 mol % $B_2O_3$ (±2.00 mol %),
8.80 mol % $Al_2O_3$ (±1.00 mol %),
61.20 mol % $P_2O_5$ (±3.50 mol %),
10.80 mol % $Li_2O$ (±2.00 mol %),
<1.0 mol % MgO,
<1.0 mol % $La_2O_3$,
0.1-1.50 mol % $Nd_2O_3$ or $Yb_2O_3$, and
0.10 mol % $As_2O_3$ (±0.05 mol %).

4. The aluminophosphate glass composition according to claim 1, wherein said glass composition comprises:
8.50 mol % $SiO_2$ (±2.00 mol %),
5.00 mol % $B_2O_3$ (±2.00 mol %),
10.00 mol % $Al_2O_3$ (±1.00 mol %),
61.20 mol % $P_2O_5$ (±3.50 mol %),
12.00 mol % $Li_2O$ (±2.00 mol %),
<1.0 mol % MgO,
<1.0 mol % $La_2O_3$,
0.1-1.50 mol % $Nd_2O_3$ or $Yb_2O_3$, and
0.10 mol % $As_2O_3$ (±0.05 mol %).

5. The aluminophosphate glass composition according to claim 1, wherein said glass composition comprises:
7.00 mol % $SiO_2$ (±2.00 mol %),
7.00 mol % $B_2O_3$ (±2.00 mol %),
8.00 mol % $Al_2O_3$ (±1.00 mol %),
61.20 mol % $P_2O_5$ (±3.50 mol %),
10.00 mol % $Li_2O$ (±2.00 mol %),
4.00-5.00 mol % MgO,
<1.0 mol % $La_2O_3$,
0.1-1.50 mol % $Nd_2O_3$ or $Yb_2O_3$, and
0.10 mol % $As_2O_3$ (±0.05 mol %).

6. The glass composition according to claim 1, wherein said composition contains 7-26 mol % $Li_2O$, the sum of the amounts of $SiO_2$ and $B_2O_3$ is 3-20 mol %, and the sum of the amounts of $SiO_2$, $B_2O_3$, and $Al_2O_3$ is 10.0-28.0 mol %.

7. The glass composition according to claim 1, wherein said composition contains 57-65 mol % $P_2O_5$.

8. The glass composition according to claim 1, wherein said composition contains 59-62 mol % $P_2O_5$.

9. The glass composition according to claim 1, wherein said composition contains 3.0-10.0 mol % $SiO_2$.

10. The glass composition according to claim 1, wherein said composition contains 3.0-9.0 mol % $B_2O_3$.

11. The glass composition according to claim 1, wherein said composition contains 6.0-10.0 mol % $Al_2O_3$.

12. The glass composition according to claim 1, wherein said composition contains 1.0-7.0 mol % $La_2O_3$.

13. The glass composition according to claim 1, wherein the total combined amount of $Na_2O$, $K_2O$, $Rb_2O$, and $Cs_2O$ is 0.0-4.0 mol %.

14. The glass composition according to claim 1, wherein the amount of $TiO_2$ is 0.0-1.0 mol %.

15. The glass composition according to claim 1, wherein the thermal-mechanical figure of merit value, $FOM_{TM}$, is at least 9.00.

16. The glass composition according to claim 1, wherein the maximum emission cross section, $\sigma_{em}$, is at least $2.5 \times 10^{-20}$ $cm^2$.

17. In a solid state laser system comprising a solid gain medium and a pumping source, the improvement wherein said solid gain medium is the glass having a composition according to claim 1.

18. A method for generating a laser beam pulse comprising flashlamp pumping or diode pumping a glass composition according to claim 1.

19. The glass composition according to claim 1, wherein said glass contains 3-12 mol % $SiO_2$.

20. The glass composition according to claim 1, wherein said glass contains 5-12 mol % $SiO_2$.

21. The glass composition according to claim 1, wherein said glass contains 3-15 mol % $B_2O_3$.

22. The glass composition according to claim 1, wherein said glass contains 5-15 mol % $B_2O_3$.

23. An aluminophosphate glass composition comprising:
4.00 mol % $SiO_2$ (±2.00 mol %),
5.00 mol % $B_2O_3$ (±2.00 mol %),
9.00 mol % $Al_2O_3$ (±1.00 mol %),
61.20 mol % $P_2O_5$ (±3.50 mol %),
1.50-3.50 mol % $Li_2O$,
15.00 mol % MgO (±2.00 mol %),
<1.0 mol % $La_2O_3$,
0.2-1.50 mol % $Nd_2O_3$ or $Yb_2O_3$, and
0.10 mol % $As_2O_3$ (±0.05 mol %).

24. An aluminophosphate glass composition comprising:
<3.0 mol % $SiO_2$,
7.00 mol % $B_2O_3$ (±2.00 mol %),
10.00 mol % $Al_2O_3$ (±1.00 mol %), 60.00 mol % $P_2O_5$ (±3.50 mol %),
1.50-3.50 mol % $Li_2O$,
15.00 mol % MgO (±2.00 mol %),
5.00 mol % ZnO (±1.00 mol %),
<1.0 mol % $La_2O_3$,
0.3-1.50 mol % $Nd_2O_3$ or $Yb_2O_3$ (±0.50 mol %), and
0.10 mol % $As_2O_3$ (±0.05 mol %).

25. An aluminophosphate glass composition comprising (based on mol %):

| | |
|---|---|
| $SiO_2$ | 3.00-12.00 |
| $B_2O_3$ | 3.00-15.00 |
| $Al_2O_3$ | 6.00-11.00 |
| $P_2O_5$ | 55.00-67.00 |
| $Li_2O$ | 0.50-26.00 |
| $K_2O$ | 0.00-4.00 |
| $Na_2O$ | 0.00-4.00 |
| $Rb_2O$ | 0.00-4.00 |
| $Cs_2O$ | 0.00-4.00 |
| MgO | 0.0-6.0 |
| ZnO | 0.00-6.00 |
| $TiO_2$ | 0.00-6.00 |
| $La_2O_3$ | 0.00-10.00 |
| $Nd_2O_3$ | 0.00-6.00 |
| $R_2O$ (R = Li, Na, K, Rb, Cs) | 8.0-26.0 |
| MO (M = Mg, Ca, Sr, Ba, Zn) | 0.0-6.0 | wherein
(a) $Ln_2O_3$ (Ln=Nd, Yb, or other lasing rare earth ions) is >0.00-10.00 mol %;
(b) the sum of $SiO_2$, $B_2O_3$, and $Al_2O_3$ is 12.0-28.0 mol %; and
(c) when $R_2O$ is $\geqq 16.0$ mol %, then $Al_2O_3$ is 6.0-10.0 mol % and the sum of $SiO_2$, $B_2O_3$, and $Al_2O_3$ is 12.0-15.0 mol %.

* * * * *

UNITED STATES PATENT AND TRADEMARK OFFICE
CERTIFICATE OF CORRECTION

PATENT NO. : 8,486,850 B2
APPLICATION NO. : 12/880767
DATED : July 16, 2013
INVENTOR(S) : Li et al.

It is certified that error appears in the above-identified patent and that said Letters Patent is hereby corrected as shown below:

In the Specification

Column 4, line 54 reads "10.00 mol% $S_iO_2$ (±2.00 mol%)," should read -- 10.00 mol% $SiO_2$ (±2.00 mol%), --

Column 5, line 9 reads "7.00 mol% $S_iO_2$ (±2.00 mol%)," should read -- 7.00 mol% $SiO_2$ (±2.00 mol%), --

Column 5, line 20 reads "4.00 mol% $S_iO_2$ (±2.00 mol%)," should read -- 4.00 mol% $SiO_2$ (±2.00 mol%), --

Column 5, line 32 reads "<3.0 mol% $S_iO_2$," should read -- <3.0 mol% $SiO_2$, --

Column 10, Table 1A line 5 reads "$S_iO_2$" should read -- $SiO_2$ --

Column 11, Table 1B line 5 reads "$S_iO_2$" should read -- $SiO_2$ --

Signed and Sealed this
Eighteenth Day of February, 2014

Michelle K. Lee
*Deputy Director of the United States Patent and Trademark Office*